May 14, 1963 W. GANZ 3,089,587
ROLLED PRESSURE-SENSITIVE ADHESIVE TAPE
Filed April 20, 1960 3 Sheets-Sheet 1

INVENTOR
WILLIAM GANZ
BY
Charles A. Harris
ATTORNEY

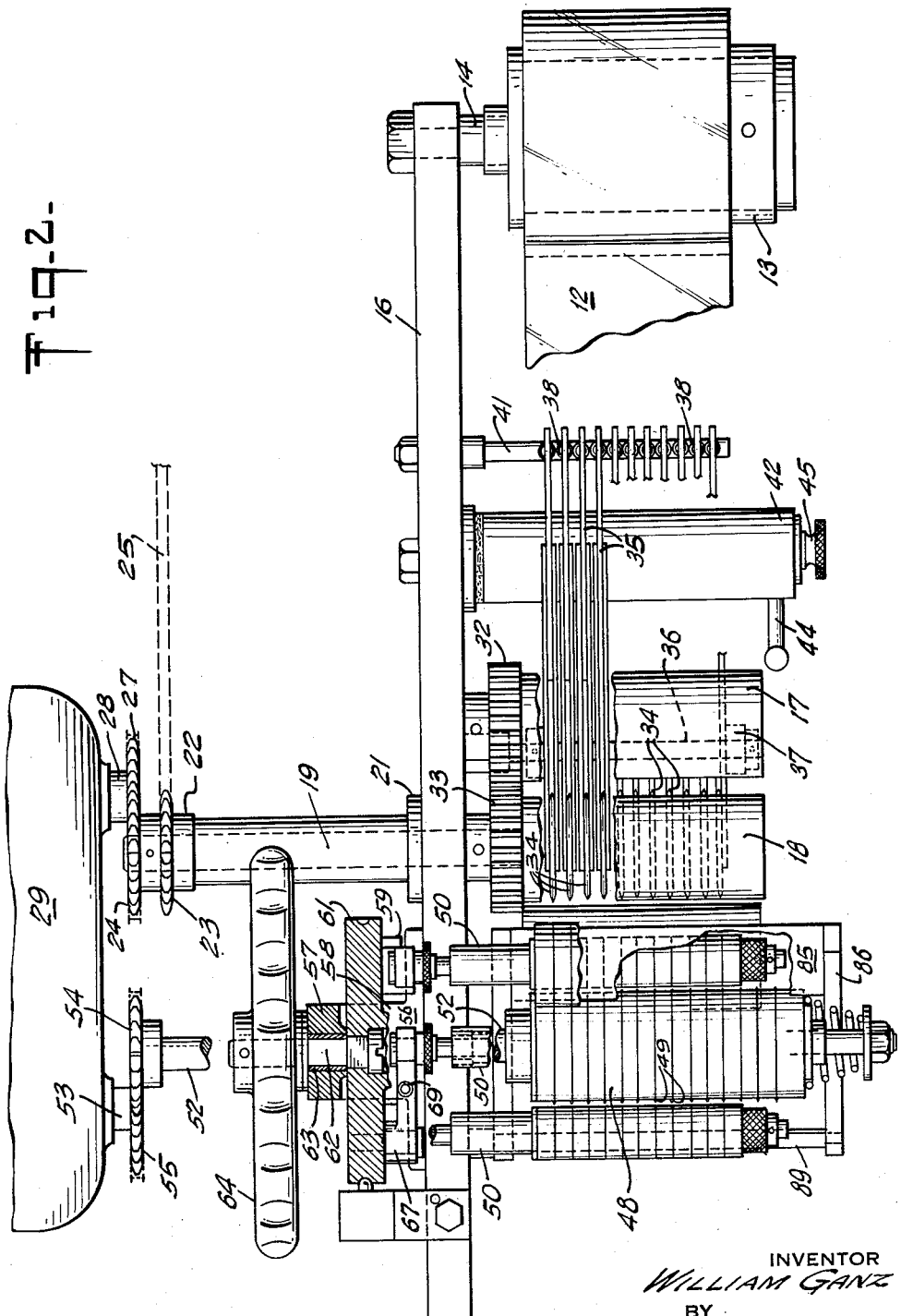

May 14, 1963 W. GANZ 3,089,587
ROLLED PRESSURE-SENSITIVE ADHESIVE TAPE
Filed April 20, 1960 3 Sheets-Sheet 3
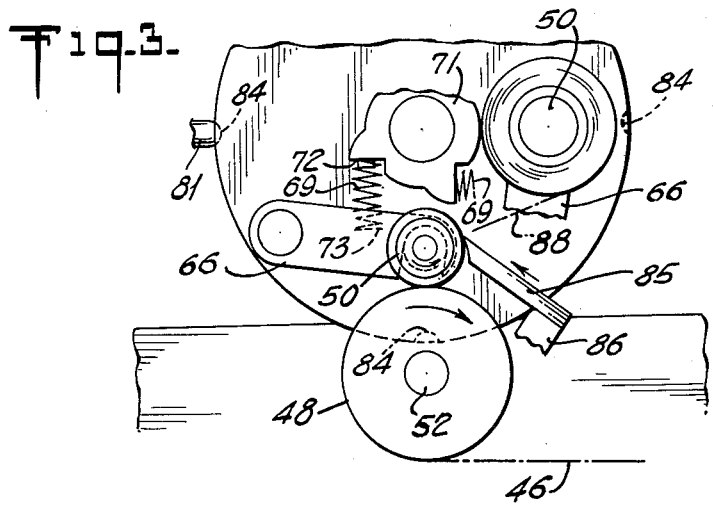
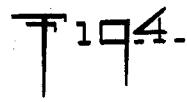
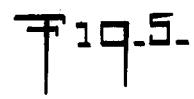
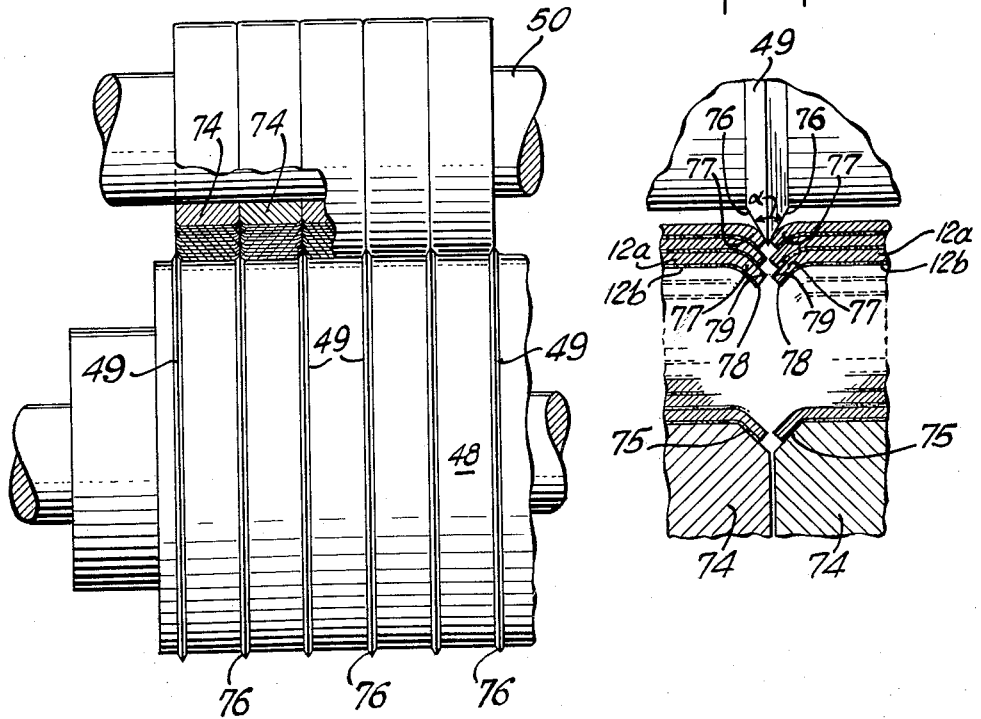
INVENTOR
WILLIAM GANZ
BY
Charles A. Harris
ATTORNEY

United States Patent Office 3,089,587
Patented May 14, 1963

3,089,587
ROLLED PRESSURE-SENSITIVE ADHESIVE TAPE
William Ganz, West Englewood, N.J., assignor to Johnson & Johnson, a corporation of New Jersey
Filed Apr. 20, 1960, Ser. No. 23,506
2 Claims. (Cl. 206—59)

The present invention relates to pressure-sensitive adhesive tape wound in roll form.

Pressure-sensitive adhesive tape normally is produced in the form of a laminate which comprises two basic elements, i.e., a backing layer and a pressure-sensitive adhesive layer on one side of the backing layer. The tape is wound upon itself to form a roll with the pressure-sensitive side of the tape facing the axis of the roll. Various other elements or layers, such as a primer or primers between the backing and the adhesive, a release coating on the other side of the backing, and the like, have been employed to assure that the tape will unwind from the roll without offsetting of the adhesive on the backing or delamination or splitting of the backing material.

Pressure-sensitive adhesive tapes are divided into categories based upon the material of the backing. For instance, there are cellophane tapes, paper tapes, vinyl tapes, strand reinforced tapes wherein reinforcing strands are included either in the backing or between the backing and the adhesive layer, and the like. All of these tapes are wound in roll form for handling, storage and use.

Since the sides of the tape roll are formed by the edges of the tape, they are adhesive to the extent that the pressure-sensitive layer of the tape is exposed. A typical tape roll may consist of anywhere from fifty to several hundred turns of tape wound in spiral form so that a good deal of adhesive is exposed on the sides of the roll even under ideal conditions. This is disadvantageous in handling, storage and use of the roll of tape and in its manufacture. To prevent the rolls from sticking together in handling and storage, suitable dividers of paper or a similar material are packed between the rolls. It also is necessary to mount the rolls in dispensers in such a way that the sides of the roll will not stick to portions of the dispenser. In manufacture, a very critical problem is presented. The various layers of the tape laminate are applied to a wide sheet of backing material and then the coated sheet is slit to the desired tape width. After slitting, the tape normally is wound upon individual cores which, in turn, are mounted upon a pair of mandrels provided for this purpose. It has been attempted to place a series of cores one next to the other upon a single mandrel and wind the slit strips of tape thereon. However, since the slit tape strips are substantially contiguous and the tape cores are placed next to one another upon the mandrel, adjacent tape rolls stick to one another because their adhesive sides are in contact. This means that the slit tape must be wound on at least two mandrels so that adjacent cores can be spaced from one another. This is disadvantageous because of the extra handling of the additional mandrel and because the spacing of the cores on the two mandrels makes automatic operation wasteful when the cores are placed on the mandrel in the form of a continuous tube which is slit while in position on the mandrel into individual cores of the proper size and in the proper location.

The present invention contemplates a roll of pressure-sensitive adhesive tape having nonadhesive sides and a machine and method for producing such a roll of tape. In a pressure-sensitive tape according to this invention, the effective side surfaces of the roll are substantially nonadhesive. The tape comprises a nonadhesive, or substantially nonadhesive, backing layer and a pressure-sensitive adhesive layer on one side of the backing layer; and the tape is wound upon itself to form a roll with the pressure-sensitive side of the roll facing the axis of the roll as described above. The edge portions of the tape are bent radially inwardly at an angle to the plane of the tape between the edges so that the top edges of the backing layer extend axially beyond, or overlap, the adhesive layer at the sides of the roll. Thus, the effective side surfaces of the roll are formed by the many turns of the backing layer which overlap each of the corresponding turns of the adhesive layer. As a result, if the sides of a tape roll according to this invention are grasped between the fingers, it does not feel sticky or adhesive, since the fingers touch only the overlapping substantially nonadhesive edges of the backing layer.

This invention also contemplates a method and means for producing tape rolls having nonadhesive sides and for winding the rolls next to one another upon a single mandrel, and for winding a plurality of substantially contiguous parallel strips of pressure-sensitive adhesive tape slit from the same sheet upon a single mandrel in such a way that the sides of adjacent rolls normally are not in contact. The fact that the sides of the roll are nonadhesive and normally are not in contact with one another when in position on the mandrel makes possible the automatic winding into rolls of pressure-sensitive adhesive tape slit from a single sheet using a single mandrel.

In accordance with the method of this invention, a plurality of parallel strips of pressure-sensitive adhesive tape slit from a single sheet are wound upon a single mandrel by positioning the strips so that their adhesive sides face the mandrel and winding the tape upon the mandrel, or upon cores mounted next to one another on the mandrel, by rotating the mandrel while pressing the edges of the strips inwardly toward the mandrel to a position below the level of the tape extending between them. The edges of the tape are depressed in such a way that the edge portions of the tape are bent inwardly and extend at an angle to the plane of the tape between the edges, and the top edges of the backing layer extend axially beyond, or overlap, the adhesive layer at the sides of the roll. A series of edge depressors is provided for this purpose in close proximity to the mandrel. The edge depressors and the mandrel normally are urged toward one another so that the depressors tend to press the edges of the tape toward the axis of the mandrel. For instance, in a preferred embodiment of a device according to this invention, the edge depressors are in the form of a plurality of circumferential rings extending radially from a guide roll having an axis generally parallel to that of the mandrel. The sides of each ring are inclined away from the surface of the guide roll and toward one another, and the rings are located axially of the guide roll on centers spaced by an amount approximately equal to the width of the tape so that when the mandrel and the guide roll are urged toward one another the inclined sides of adjacent edge depressors contact opposite edges of each of the tape strips and press them inwardly toward the roll at an angle to the plane of the tape between the edges.

According to this invention, a plurality of mandrels may be mounted on a turret or a similar device in such a way that a new mandrel may be moved into position to replace an old mandrel or one which has just been filled without seriously interfering with the automatic tape winding operation.

Other and further objects of the invention will be apparent from the following description and claims taken together with the drawings wherein:

FIG. 2 is a partially cutaway top view partly in plan and partly in section of the machine of FIG. 1;

FIG. 3 is an enlarged schematic view partly in elevation and partly in section of a portion of the machine of FIGS. 1 and 2 showing the relationship between the mandrel, the guide means and the cutoff means employed;

FIG. 4 is a more greatly enlarged elevational view partially broken away to show the relationship between the tape depressors on the guide roll and the rolls of tape on the mandrel in the machine of the previous figures; and FIG. 5 is a very greatly enlarged schematic view showing the relationship of one of the edge depressors to the tape being wound into rolls, and the resulting tape rolls.

Figure 1:
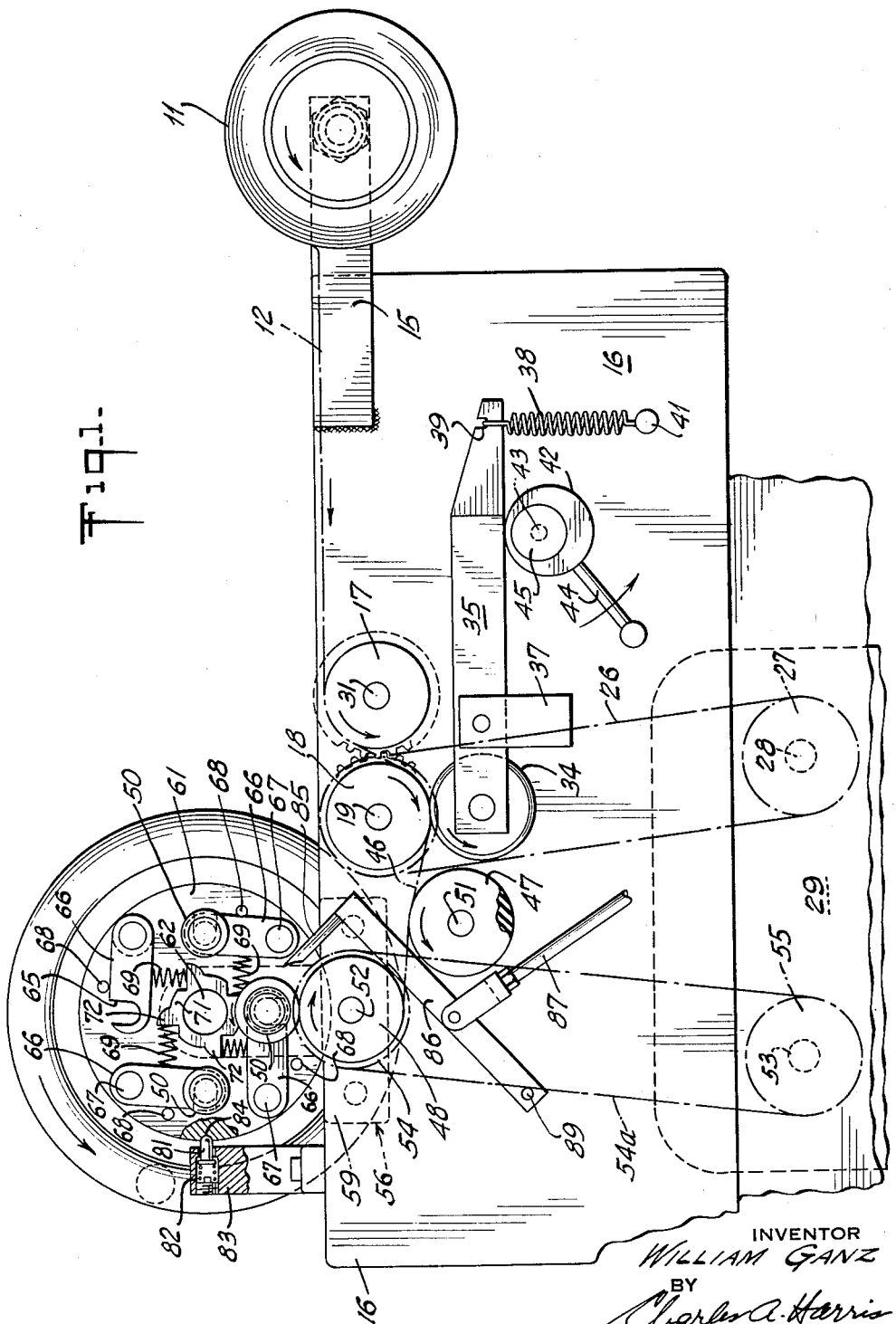
FIG. 1 is a schematic side view partly in elevation and partly in section of a machine according to this invention.

Referring to the drawings, a supply roll 11 comprising a pressure-sensitive adhesive sheet 12 wound upon a drum 13 with its adhesive side facing the drum is rotatably mounted on a shaft 14 extending from a girder 15 attached to the end of one side frame 16 of the machine. The sheet 12 comprises a substantially nonadhesive backing layer 12a and a pressure-sensitive adhesive layer 12b on one side of the backing layer. The sheet 12 with its adhesive side down is drawn from the supply roll, over a silicone coated guide roll 17, and then under an adjacent steel anvil roll 18. The anvil roll 18 is mounted on a drive shaft 19 which extends through a bushing 21 secured to the side plate. The outer end of the drive shaft is keyed to a fitting 22 which mounts a pair of sprockets 23 and 24. The sprocket 23 is connected to a driving motor, not shown, by a drive chain 25; and the other sprocket 24 is connected by another drive chain 26 to a sprocket 27 fixed to an input shaft 28 in a variable drive unit 29 suitably mounted on one side of the machine. The variable drive unit may be a "positive infinite variable," or P.I.V. drive unit of the type manufactured under this designation by the Link Belt Corporation. The silicone coated guide roll 17 also is mounted for rotation on a shaft 31 which extends from the side plate and is driven from the anvil roll 18 by a gear 32 which meshes with a corresponding gear 33 at the inside end of the anvil roll.

A series of circular slitter knives 34 are mounted at the ends of corresponding slitter supporting arms, or levers, 35 in such a way that the knives normally are urged toward the anvil roll 18. The knives are mounted in such a way that they are equally spaced in series and the number of knives corresponds to the number of slits which are to be made in the sheet. Each of the arms 35 is mounted for movement about a fulcrum provided by a pivot shaft 36 passing through the arms 35 not far from the slitting knives 34. The pivot shaft 36, in turn, is mounted on uprights 37 which are suitably supported from the machine frame. The opposite ends of the levers 35 are urged downward by a series of tension springs 38, one for each lever. One end of each spring fits in a notch 39 provided in the lever and the other end is attached to a bar 41 extending from and mounted in the side plate 16.

The position of the slitter knives 34 is determined by a cam 42 which is mounted on a shaft 43 extending from the side plate 16. The springs 38 draw the rear ends of the lever arms 35 down upon the cam 42 so that the position of the cam determines the elevation of the rear of the lever arms, and correspondingly the height of the circular slitters 34 at the other end of the arms 35. Thus, when it is desired to depress the slitters 34, the cam 42 is rotated by a handle 44 extending therefrom to raise the rear ends of the levers 35. The position of the cam 42 is fixed by a holding nut 45 having a knurled handle portion. The nut 45 is tightened to hold the cam in any given position.

After slitting, the tape 46, in the form of a plurality of contiguous parallel strips extending in the same direction and in the same plane, is led over a soft rubber positioning roll 47 to the underside of a tape guide roll 48 which mounts a series of depressors 49 for winding the tape upon a single mandrel 50. The rubber positioning roll is mounted for rotation on a shaft 51 extending from the side plate 16 and is located so as to run in contact with the adhesive side of the tape 46 and raise it above the normal line between a common tangent to the periphery of the anvil roll 18 and the tape guide roll 48. The tape guide roll 48 is mounted for rotation on a secondary drive shaft 52 extending through the side plate and drivably connected to the output shaft 53 of the variable drive unit 29 by a drive chain 54a extending between corresponding sprockets 54 and 55 mounted at the ends of the secondary drive shaft 52 and the output shaft 53 of the variable drive unit, respectively, for this purpose. The speeds of rotation of the drive shaft 19 and the secondary drive shaft 53 are regulated by adjusting the variable drive unit 29 so that the peripheral speed of the anvil roll 18 is equal to the mean peripheral speed of the depressors 49 on the tape guide roll.

A hand-operated turret is mounted on a bracket 56 which extends upwardly from the outside of the side plate 16. The bracket has an upright leg 57 and a horizontal leg 58 which, in turn, is bolted to the side plate 16 through a vertical flange 59 provided for this purpose. The turret is in the form of a cylindrical plate, or disk, 61 fixed to a turret shaft 62 which extends through a sleeve 63 in the vertical leg 57. A hand wheel 64 is keyed to the turret shaft 62 on the opposite side of the vertical upright 57. A group of four mandrels 50 is mounted on the turret, and the turret is adapted to be operated by the hand wheel 64 for positioning the mandrels, one at a time, adjacent the depressors 49 on the tape guide roll 48 for winding tape on the mandrel.

Each of the mandrels 50 is rotatably mounted in a slot 65 at the end of an arm 66 which, in turn, is mounted for rotation about its opposite end on a pin 67 fixed to the turret. Each of the arms 66 also is spring-urged outwardly about the pin 67 until it contacts a stop 68 extending from the turret. A group of four compression springs 69 is provided for this purpose between the individual pivot arms 66 and a central sleeve 71 fixed to the turret. The sleeve 71 presents four shoulders 72, 90° apart about the centerline of the turret, and each of the springs 69 extends between one of the shoulders 72 and a seat 73 provided on the inside of one of the pivot arms 66, for this purpose. Thus, the mandrels 50 normally are urged outwardly toward a position determined by the point at which the pivot arms 66 contact the stops 68. The turret and the tape guide roll are so located with respect to one another that the mandrel 50 normally is urged into contact with the depressors 49 on the guide roll by the springs 69.

The mandrels 50 may be of the type which are expandable by air pressure or which are mechanically expandable, or they may be merely knurled for receiving and holding cores 74 on which the tape is wound for use. It is preferred for the purposes of this invention that the tape be wound upon cores which either possess relieved edges 75 to correspond roughly to the shape of the depressors 49 or which may be shaped to some extent by the depressors to facilitate the turning in of the edges of the tape. When ordinary cardboard cores are used, it is preferred that the edges of the cores be relieved; but this is not absolutely necessary.

The depressors 49 are in the form of a plurality of circumferential rings or flanges arranged in series on the tape guide roll 48 so as to extend outwardly therefrom toward the adjacent mandrel 50. The tape guide roll 48 itself is mounted on an axis which is generally parallel to that of the adjacent mandrel and spaced radially from that of the mandrel so that when the turret is rotated to bring one of the mandrels 50 in line with the tape guide roll 48 the surfaces of the mandrel, or the tape cores 74 mounted on the mandrel, normally would be in contact with the depressors 49 on the tape guide roll 48, being urged in that direction by one of the springs 69. The depressor rings 49 are located axially on the tape guide roll 48 on centers spaced by an amount approximately equal to the width of the tape; or, putting it another way, the depressor rings are centered on the slits between the strips of tape. The depressors 49 are generally V-shaped in cross section, i.e., the sides 76 of each ring are inclined away from the surface of the guide roll 48 and toward one another. Normally the inclination of the sides 76 continues until the sides meet to form a "dull" edge. In a preferred cross-sectional shape for the depressor rings of this invention, the angle α included between the inclined sides 76 of the rings is approximately 60°, as shown schematically in FIG. 5.

In operation, the back of the tape 46 is led around the tape guide roll 48 in contact with the depressor rings 49 and between the tape guide roll and the mandrel 50 which is positioned above the roll at the time. The mandrel is then allowed to press down upon the tape guide roll to hold the tape between them. The ends of the tape 46 are pressed into adhesive contact with the mandrel, and the tape then is ready to be wound upon the mandrel with its adhesive layer 12b facing the mandrel 50. Conventional start and stop means are provided for driving the apparatus; and the unit is driven through the anvil roll 18 on the one hand and the tape guide roll 48 on the other, both of which are connected to the driving motor as described hereinbefore. Since the tape guide roll 48 is in compressive contact with the mandrel on which the tape is to be wound, it causes this mandrel to rotate as tape is to be wound upon it. At the same time the mandrel 50 is continually pressing down toward the tape guide roll, and its movement in this direction is continually resisted by the V-shaped depressor rings 49. Since the rings are in contact with the edges of the tape strips 46, the edges of the strips are continually depressed or pressed inwardly toward the mandrel to a position below the level of the tape extending between them. The circumferential portions 77 of the tape adjoining the edges are bent, or turned, inwardly so that they extend at an angle to the plane of the tape between the edges thereof, as shown in FIG. 5. The angle at which the edge portions 77 of the tape are turned inwardly tends to approximate the shape of the depressor ring 49 but normally is substantially less than the angle formed between the sides 76 of the rings and the plane of the tape between the edge portions 77. Since the tape normally possesses some resiliency even if it initially is turned in at the same angle as that made between the sides of the depressor rings and the plane of the tape, it will tend to spring back somewhat with the result that when the tape is at rest it is not turned in as much as it was initially. For the purposes of this invention, it is important that the edge of the tape be turned in enough so that the sides 78 of the edges of adjacent tape rolls do not come into direct contact with one another, except possibly at the corners 79 formed by the top surface of the edge portions 77 of the tape and the sides 78. Normally, however, and preferably, as shown schematically in FIG. 5, the edges of adjacent strips of tape do not contact one another at all, since they are bent downwardly and away from one another and therefore rotated out of the normal line of contact between the tape strips so that the closest portions of adjacent tape rolls do not contact one another.

In the resulting roll of tape there normally are many turns, sometimes several hundred turns, of tape wound upon a single roll. In tape rolls according to this invention the edge portions 77 of the tape are turned down, as shown schematically in FIG. 5, so that the effective contact surface of the side of the roll is substantially nonadhesive. The effective contact surface of the side of the roll is formed by the corners 79 presented between the downturned top surfaces of the edge portions 77 of the tape and the corresponding side surfaces 78 of the tape edges. The adhesive layer 12b of the tape is on the inside thereof. As shown in FIG. 5, the corners presented by the inside surface of the tape and the side surface 78 of the tape edges in adjacent rolls are turned inwardly and away from one another in such a way that they could not possibly contact one another. Thus, the adhesive portion of a given tape roll is effectively held out of contact with the adhesive portion of an adjacent tape roll; and if the roll is gripped between the hands, it does not fell sticky because the hand only contacts the nonadhesive corners 79 formed between the top surface of the tape and the side surfaces 78 of the tape edge. Thus the effective side surface of the tape roll, i.e., that which would be contacted by an object pressed into contact with the side of the roll, is substantially, if not entirely, free of adhesive, or substantially nonadhesive.

As tape is wound upon the mandrel 50, the mandrel itself continually is pressed upwardly and moved upwardly against the resistance of the spring 69 acting on the pivoting arm 66 to provide room for additional thicknesses of tape which are wound on the mandrel and therefore take up room between the mandrel surface and the depressor rings 49 on the tape guide roll. When a desired amount of tape is wound upon a particular mandrel, rotation of the tape guide roll and the anvil roll is stopped; and the turret is rotated by operating the hand wheel 64 until the next mandrel 50 is positioned above the tape guide roll 48. A spring loaded detent 81 is mounted in a bore 82 provided in an arm 83 bolted to the side frame 16 for the purpose of holding the turret with a mandrel 50 in position above the tape guide roll 48. Corresponding recesses 84 are provided in the periphery of the turret plate 61 at 90° from one another to correspond to the winding positions of each of the four mandrels 50. When the next mandrel is in position above the tape guide roll, the preceding mandrel, i.e., the one to which the tape is still attached, will be in a position 90° away, as shown schematically in FIG. 3. A knife blade 85 mounted at the end of a pair of cutting arms 86 which in turn are pivotally mounted on supporting arms 87 extending upwardly from the base of the machine is provided to press the length 88 of tape extending between the full mandrel and the tape guide roll 48 around a portion of the periphery of the new mandrel and then to cut the tail end of the tape extending between the new mandrel and the old mandrel so that the new end remains adhered to the new mandrel. A bar 89 connects the two lever arms at the opposite end from the knives, and the lever arm is operated by pressing downwardly upon the bar to pivot the knife 85 into contact first with the tape 46 and then the new mandrel 50 which, in turn, acts as an anvil for cutting of the tape. The full mandrel may be removed from the turret at any convenient time to allow removal of the rolls carried by the tape spools at any time before the new mandrel is completely wound with tape. While positions for four mandrels are provided in the turret shown in the drawings, only two mandrels are necessary in the operation described, provided that the rolls may be removed from the old mandrel and the mandrel reloaded with spools before the new mandrel is completely wound with tape. However, the turret may be made fully automatic, in which case it too may be rotated automatically by a suitably timed device after a predetermined amount of tape is wound upon one of the mandrels; and the knife and the rest of the mechanism may be operated automatically in a synchronized fashion which would allow the machine to be operated faster in a continuous operation. In this event it may be very desirable to have four mandrel positions rather than just two in order to provide sufficient time for removal of full rolls and loading with a new set of tape cores.

Having now described the invention in specific detail and exemplified the manner in which it may be carried into practice, it will be readily apparent to those skilled in the art that innumerable variations, modifications, applications, and extensions of the basic principles involved may be made without departing from its spirit and scope.

The invention claimed is:

1. A roll of pressure-sensitive adhesive tape which comprises a substantially nonadhesive backing layer and a pressure-sensitive adhesive layer on one side of the backing layer, said tape being wound upon a cylindrical core and then in successive convolutions upon itself in the form of a roll with the pressure-sensitive side of the tape facing the axis of the roll, the edge portions of said tape being bent radially inwardly at an angle to the plane of the tape between the edges, and the nonadhesive corners presented between the top surfaces of the down-turned edge portions of the tape and the corresponding side surfaces of the tape edges being axially spaced outwardly from the adhesive corners presented between the bottom surfaces of the down-turned edge portions of the tape and the corresponding side surfaces of the tape edges and being substantially free of adhesive, the innermost convolution of the tape roll adhering to the surface of the core from edge to edge of the tape, whereby the effective side surfaces of the roll are nonadhesive.

2. A roll of pressure-sensitive adhesive tape which comprises a substantially nonadhesive backing layer and a pressure-sensitive adhesive layer on one side of the backing layer, said tape being wound upon a cylindrical core and then in successive convolutions upon itself in the form of a roll with the pressure-sensitive side of the tape facing the axis of the roll, the edge portions of said tape being bent radially inwardly at an angle to the plane of the tape between the edges, and the nonadhesive corners presented between the top surfaces of the down-turned edge portions of the tape and the corresponding side surfaces of the tape edges being axially spaced outwardly from the adhesive corners presented between the bottom surfaces of the down-turned edge portions of the tape and the corresponding side surfaces of the tape edges, said cylindrical core having indented portions along the side edges of its periphery and the down-turned edge portions of the innermost convolution of the tape roll adhering to the indented portions of said core, whereby the effective side surfaces of the roll are nonadhesive.

References Cited in the file of this patent

UNITED STATES PATENTS

| | | |
|---|---|---|
| 1,955,741 | Eitzen | Apr. 24, 1934 |
| 2,132,937 | Debus | Oct. 11, 1938 |
| 2,676,765 | Kaplan | Apr. 27, 1954 |
| 2,750,030 | Tierney | June 12, 1956 |
| 2,772,774 | Rabuse | Dec. 4, 1956 |